United States Patent [19]
Konomoto

[11] Patent Number: 6,085,420
[45] Date of Patent: Jul. 11, 2000

[54] METHOD OF MAKING A SLIDER OF A LINEAR GUIDE DEVICE

[75] Inventor: Masashi Konomoto, Tokyo, Japan

[73] Assignee: THK Co., Ltd., Tokyo, Japan

[21] Appl. No.: 08/845,151

[22] Filed: Apr. 21, 1997

[30] Foreign Application Priority Data

Apr. 25, 1996 [JP] Japan .................................. 8-105856

[51] Int. Cl.[7] .............................. B23P 15/00; F16C 33/00
[52] U.S. Cl. ........................ 29/898.03; 29/527.3; 29/434; 264/318; 264/296; 384/45
[58] Field of Search ................................ 29/527.2, 527.3, 29/434, 898.03 OR, 898.047, 898.049, 898.05; 264/242, 250, 255, 259, 267, 268, 269, 274, 275, 279, 318, 336, 248, 296; 384/45

[56] References Cited

U.S. PATENT DOCUMENTS

| | | | |
|---|---|---|---|
| 5,380,099 | 1/1995 | Teramachi | 384/45 |
| 5,477,614 | 12/1995 | Watanabe | 29/898.045 |
| 5,551,141 | 9/1996 | De'Ath et al. | 29/527.3 |
| 5,582,487 | 12/1996 | Teramachi | 384/45 |
| 5,596,805 | 1/1997 | Kunze et al. | 29/898.055 |
| 5,640,768 | 6/1997 | Teramachi | 29/898.03 |

FOREIGN PATENT DOCUMENTS 7-317762  12/1995  Japan .

Primary Examiner—Larry I. Schwartz
Assistant Examiner—Marc W. Butler
Attorney, Agent, or Firm—Armstrong, Westerman, Hattori, McLeland & Naughton

[57] ABSTRACT

The present invention relates to a method of making a slider of a linear guide device for guiding a movable body such as a work table or an industrial robot of a machine tool under load which moves along a track rail arranged at a fixed portion such as a bed, a column or the like, the method is comprising a first step of forming a block main body made of a metal which becomes a core part of the slider in a predetermined shape and forming load rolling faces of balls on the block main body by machine, and a second step of inserting the block main body formed in the first step into a mold and executing an injection molding of a synthetic resin by which ball retaining portions are built on both sides of the load rolling faces of block main body, and according to the first step pairs of smooth faces for shielding the molten synthetic resin are formed along the both edges in the longitudinal direction of the load rolling faces formed on block main body whereas according to the second step the block main body is fixed at a predetermined position in the mold by bringing a projected support portion on the side of the mold into contact with the smooth faces for shielding the molten synthetic resin.

2 Claims, 8 Drawing Sheets

METHOD OF MAKING A SLIDER OF A LINEAR GUIDE DEVICE

FIELD OF THE INVENTION AND RELATED ART STATEMENT

The present invention relates to a method of making a slider of a linear guide device for guiding a movable body such as a work table of a machine tool or an industrial robot or the like moving along a track rail arranged at a fixed portion such as a bed, a column or the like while applying load on the track rail, particularly to a method of forming a slider by building up a synthetic resin onto a block main body mace of a metal.

There has been known a conventional linear guide device of such a kind constituted by a track rail that is arranged at a fixed portion such as a bed or the like and on which rolling faces of balls are formed and a slider integrated to the track rail via a number of balls for moving along the track rail while supporting a movable body such as a table or the like.

Further, the above-described slider is constituted by a movable block having load rolling faces opposed to the rolling faces of the track rail via balls and ball return holes in parallel to the load rolling faces, which is movable along the track rail by rolling the balls, a pair of end caps respectively fixed to forward and backward end faces of the moving block and having direction change paths of the balls for communicating and connecting the load rolling faces with the ball return holes and ball retainers attached to the moving block for preventing the balls from coming off from the load rolling faces when the slider is removed from the track rail. Also, end portions of the load rolling faces and the ball return holes are connected by the direction change paths by fixing the end caps to the forward and rearward end faces of the moving block whereby infinite circulation paths of balls are completed in the slider.

Meanwhile, according to the conventional slider for the linear guide device constituted as described above, boring of the ball return hole, attaching operation of the ball retainers and the like are needed with respect to the moving block and considerable time and labor is required in manufacturing the slider. Therefore, the applicants have proposed to manufacture the slider by utilizing an injection molding process of a synthetic resin (Japanese Unexamined Patent Publication No. JP-7-317762).

Specifically, a synthetic resin is built up by injection molding onto a block main body made of a metal where the above-described load rolling faces have been ground and the ball return holes and the ball retainers are integrally formed with the block main body in the injection molding by which the moving block is manufactured, which is provided with an advantage whereby a moving block having a complicated shape can easily he manufactured.

Meanwhile, in building up a synthetic resin onto the block main body made of a metal, the ball retaining portions are formed on the both sides of the load rolling faces of the block main body as described above, where it is necessary to expose the load rolling faces per se on which the balls run without putting the synthetic resin on the load rolling faces. Therefore, it is necessary to cover the load rolling faces against the molten synthetic resin in the injection molding.

Accordingly, conventionally, in fixing the block main body in the mold of the injection molding, a projected support portion provided on the side of the mold is brought into contact with the load rolling faces of the block main body and the load rolling faces are covered against the molten synthetic resin by the projected support portion.

However, when the load rolling faces are covered by bringing the projected support portion of the mold into direct contact with the load rolling faces, since the load rolling faces are formed in a curved face corresponding to the curvature of the ball, it is necessary to form the projected support portion in contact with the load rolling faces also in a curved face in compliance with the curvature of the load rolling faces and if the curved faces of both are not brought into accurate alignment, the molten synthetic resin forming the retainers invades a clearance therebetween.

Furthermore, when the molten synthetic resin invades the clearance between the load rolling faces and the projected support portion of the mold, the molten synthetic resin constitutes burrs of the synthetic resin covering the load rolling faces and the smooth running of the balls is significantly hampered under such a state. Also, once the ball retainers are formed on the both sides of the load rolling faces, the load rolling faces cannot be polished since the ball retainer becomes a hazard for the polishing operation and therefore, the constituted burrs cannot be removed. Accordingly, in the method of manufacturing the moving block utilizing the injection molding, a countermeasure for preventing the occurrence per se of burrs covering the load rolling face is indispensable.

Meanwhile, it is preferable to set the block main body to the mold with the load rolling faces which have been formed, as positioning references in fixing the block main body in injection molding, since the ball retaining portions are needed to form accurately in the positional relationship thereof with the load rolling faces.

However, it is difficult to position the block main body by bringing the load rolling faces in contact with the projected support portion on the side of the mold, which is also formed in a curved face since the load rolling faces are formed in a curved face as described above. Especially, when the load rolling faces face in different four directions, it is extremely difficult to accurately position the block main body in the mold.

Also, when the projected support portion of the mold is brought into contact with the load rolling faces, the load rolling faces which have been grounded in the finishing operation may be damaged with high probability and the grinding operation of the block main body prior to the injection molding operation may completely be spoilt.

OBJECT AND SUMMARY OF INVENTION

The present invention has been carried out in view of such a problem and it is an object of the present invention to provide a method of making a slider of a linear guide device in which in forming the slider of the linear guide device installed with ball return holes and ball retaining portions by building up a synthetic resin onto a block main body made of a metal, the synthetic resin does not bring about burrs on load rolling faces of the block main body and the ball return holes and the retainers can be formed accurately.

In order to achieve the above-described object, a method of making a slider according to the present invention is comprising a first step of forming a block main body made of a metal which becomes a core part of the slider in a predetermined shape by machining and forming load rolling faces of balls on the block main body, and a second step of inserting the block main body formed in the first step into a mold and executing an injection molding of a synthetic resin whereby ball retaining portions are built on both sides of the load rolling faces of the block main body, wherein according to the first step pairs of smooth faces for shielding the molten synthetic resin are formed on both edges in the longitudinal direction of the load rolling faces formed on the block main body, whereas according to the second step the block main body is fixed at a predetermined position in the mold by bringing a projected support portion erected on the mold into contact with the smooth faces for shielding the molten synthetic resin.

As describe above, in forming the ball retaining portions on the both sides of the load rolling faces by utilizing the injection molding of a synthetic resin, it is necessary to prevent the molten synthetic resin from invading the load rolling faces. According to the invented method having the above-described steps, with respect to the main body fixed in the mold the pairs of faces for shielding the synthetic resin formed along the both edges of the load rolling faces are brought into contact with the projected support portion erected on the mold and therefore, the molten synthetic resin for forming the ball retaining portions can be prevented from flowing to the load rolling faces by the smooth faces for shielding the molten synthetic resin. Moreover, the smooth faces for shielding a molten synthetic resin are not formed in a curved face as in the load rolling faces but in a smooth face and therefore, no clearance is formed between the smooth faces for shielding the molten synthetic resin and the projected support portion of the mold which are brought into contact with each other and the molten synthetic resin can firmly be prevented from invading the load rolling faces. Therefore, according to the invented method formation of burr of the synthetic resin on the load rolling faces can firmly be prevented.

Meanwhile, when the slider made by this method is observed, it is recognized that the pairs of smooth faces for shielding the molten synthetic resin mold which become positioning references for fixing the main body in the injection molding and which are disposed between the load rolling faces and the ball retaining portions on the both sides of the load rolling faces, are exposed without being covered by the ball retaining portions. Accordingly, whether a slider is made by the invented method, can be determined by whether the pairs of faces for shielding the molten synthetic resin, which has been finished smoothly to a degree whereby they can be utilized as positioning references, are exposed on the both edges along the longitudinal direction of the load rolling faces. That is, according to another aspect of the present invention, there is provided a slider of a linear guide device wherein pairs of faces for shielding a molten synthetic resin which become references for fixing a block main body in injection molding, are exposed on both edges along the longitudinal direction of load rolling faces.

Also, according to the invented method, in the second step the block main body is positioned and fixed in the mold by bringing the projected support portion of the mold into contact with the smooth faces for shielding the synthetic resin and therefore, the positioning accuracy of the block main body in the mold is promoted in comparison with the conventional case in which the positioning is carried out by using the load rolling faces in a curved face whereby the positioning relationship between the ball retaining portions built up on the block main body by injection molding and the load rolling faces can be made accurate. Thereby, it can be prevented that noise is caused due to contact of the balls running on the load rolling faces with the ball retaining portions or the circulation of the balls becomes unstable in using the linear guide device.

Further, according to the invented method the block main body is fixed in the mold by bringing the projected support portion of the mold into contact with the faces for shielding the synthetic resin. It is preferable in this procedure that the projected support portion is brought into contact with the faces for shielding the molten synthetic resin which are formed on the both edges to span across the load rolling faces whereby spaces are formed between the projected support portion and the load rolling faces. The reason is that according to the invented method the machining of the load rolling faces are completed in the first step prior to the injection molding and therefore, if the projected support portion in the mold is brought into contact with the load rolling faces in the second step, the load rolling faces which have been finished with a predetermined face accuracy will be roughened.

As described above, according to the invented method the both edges of load rolling faces of the block main body which becomes a core part of a slider, are formed with the pairs of smooth faces for shielding the molten synthetic resin and in the step of the insert molding for building the synthetic resin on the block main body the faces for shielding the molten synthetic resin and the projected support portion erected on the mold are brought into contact. Therefore, the formation of burrs of the synthetic resin on the load rolling faces through the process of the insert molding can be prevented and the ball retaining portions can be formed accurately on the block main body whereby the slider of a linear guide device on which the balls run smoothly and in which generation of noise accompanied by the circulation of the balls is restrained as less as possible, can be manufactured.

DETAILED DESCRIPTION OF THE PREFERRED EMBODIMENTS

A detailed explanation will be given of a method of making a slider of a linear guide device according to the present invention in reference to the attached drawings as follows.

Figure 1:
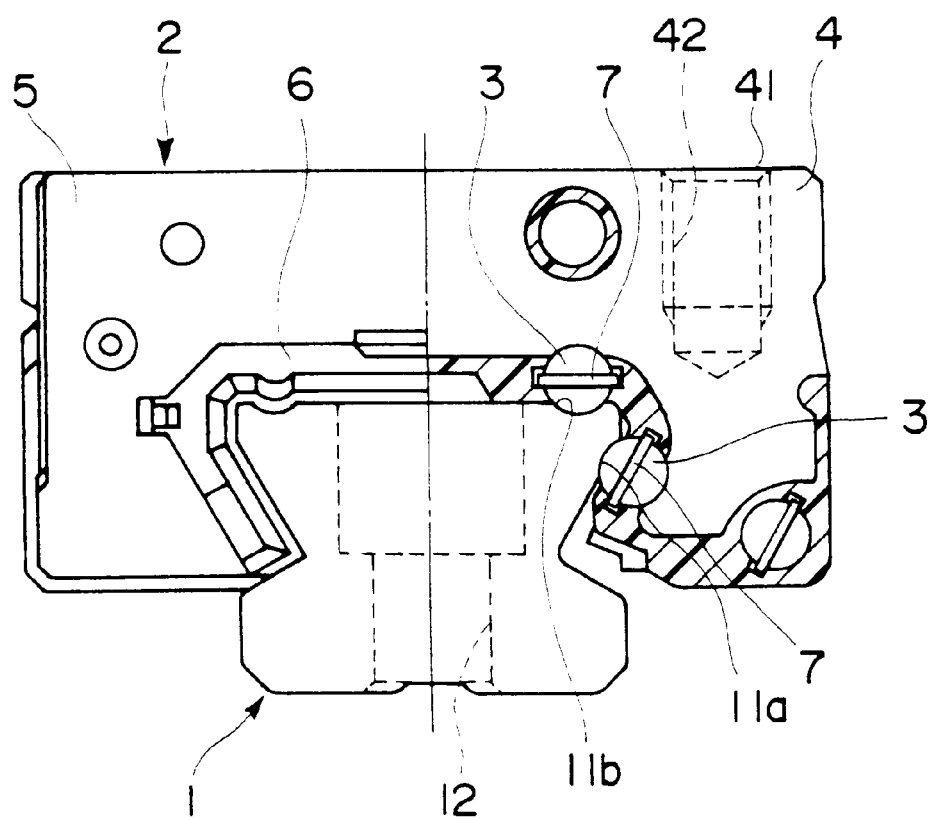
FIG. 1 is a partially cut front view showing an embodiment of a linear guide device manufactured by the invented method.
Figure 2:
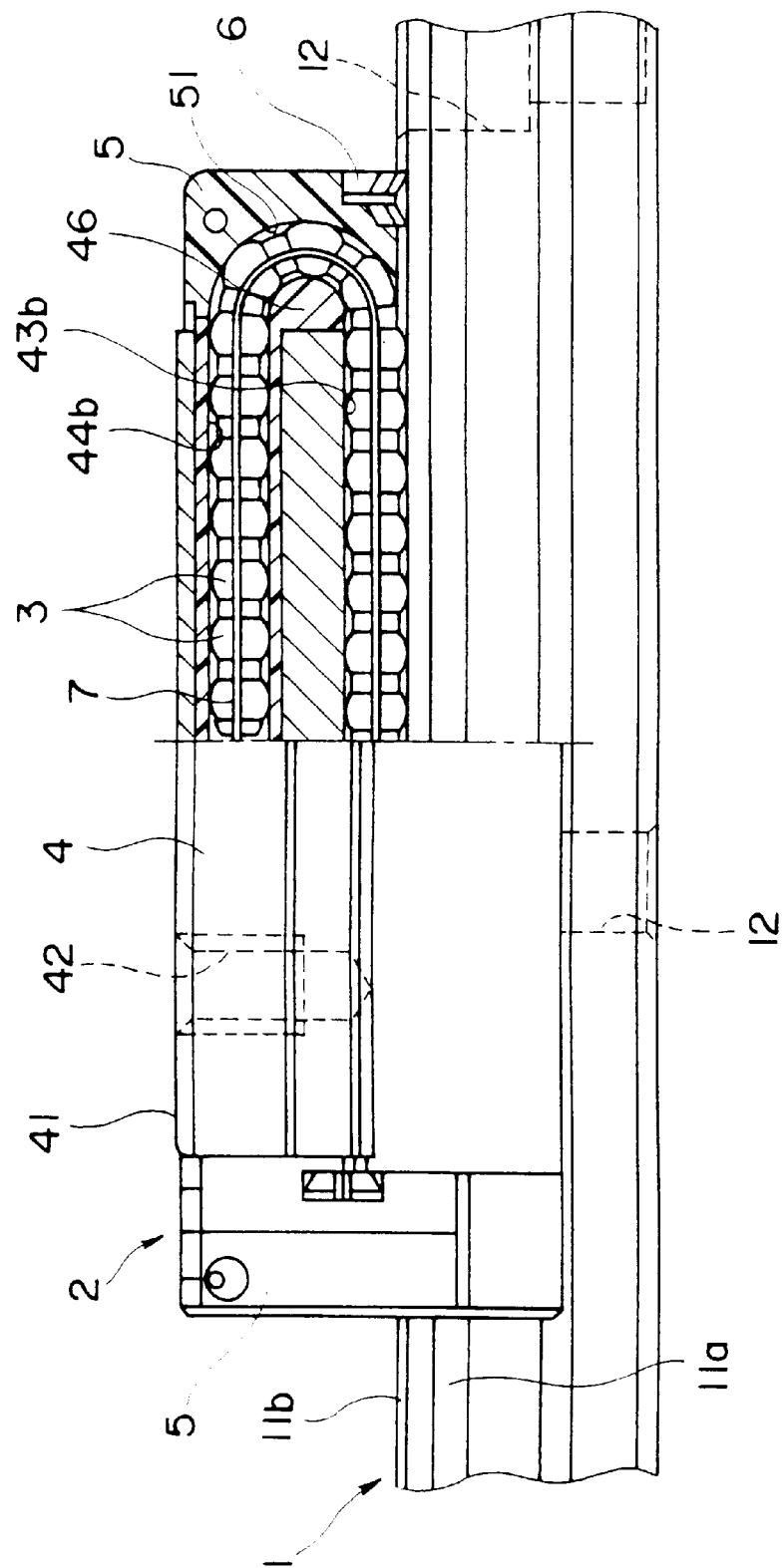
FIG. 2 is a partially cut side view showing the embodiment of the linear guide device manufactured by the invented method.

FIG. 1 and FIG. 2 illustrate an embodiment of a linear guide device in which a slider manufactured by the invented method is integrated with a track rail. In FIGS. 1 and 2, numeral 1 designates a track rail arranged to a fixed portion such as a bed or the like of a machine tool, numeral 2 designates a slider for guiding a movable body such as a table or the like along the track rail 1 and numeral 3 designates a ball rolling under load between the track rail 1 and the slider 2 and infinitely circulated in the slider 2.

Firstly, the section of the track rail 1 is formed in substantially a square shape in which a total of four tracks of ball rolling face 11a and 11b on which the balls 3 run, are formed along the longitudinal direction (orthogonal to the paper face of FIG. 1). These ball rolling faces 11a and 11b are formed on the both side faces and the both edge portions of the upper face of the track rail 1 in which the ball rolling faces 11a on the both side faces are formed 30 downwardly from the left and right direction of the paper face whereas the ball rolling faces 11b on the upper face are formed upwardly in the vertical direction. Further, bolt attaching holes 12 are formed in the track rail 1 at pertinent intervals in the longitudinal direction and the track rail 1 is fixed to a fixed portion by fixing bolts, not illustrated, which are inserted into the bolt attaching holes 12.

Meanwhile, the slider 2 is constituted by a moving block 4 having an attaching face 41 for attaching a movable body such as a table or the like and tap holes 42 for screwing fixing bolts of the movable body and a pair of end caps 5 fixed to the foreword and rearward end faces of the moving block 4 and infinite circulation paths of the balls 3 are provided in the slider by fixing the end caps 5 to the moving block 4. Further, seal members 6 which are brought into abrasive contact with the track rail 1 are attached to the end caps 5 for preventing dust or dirt attached onto the track rail 1 from invading the inside of the slider 2 accompanied by the movement of the slider 2.

Figure 3:
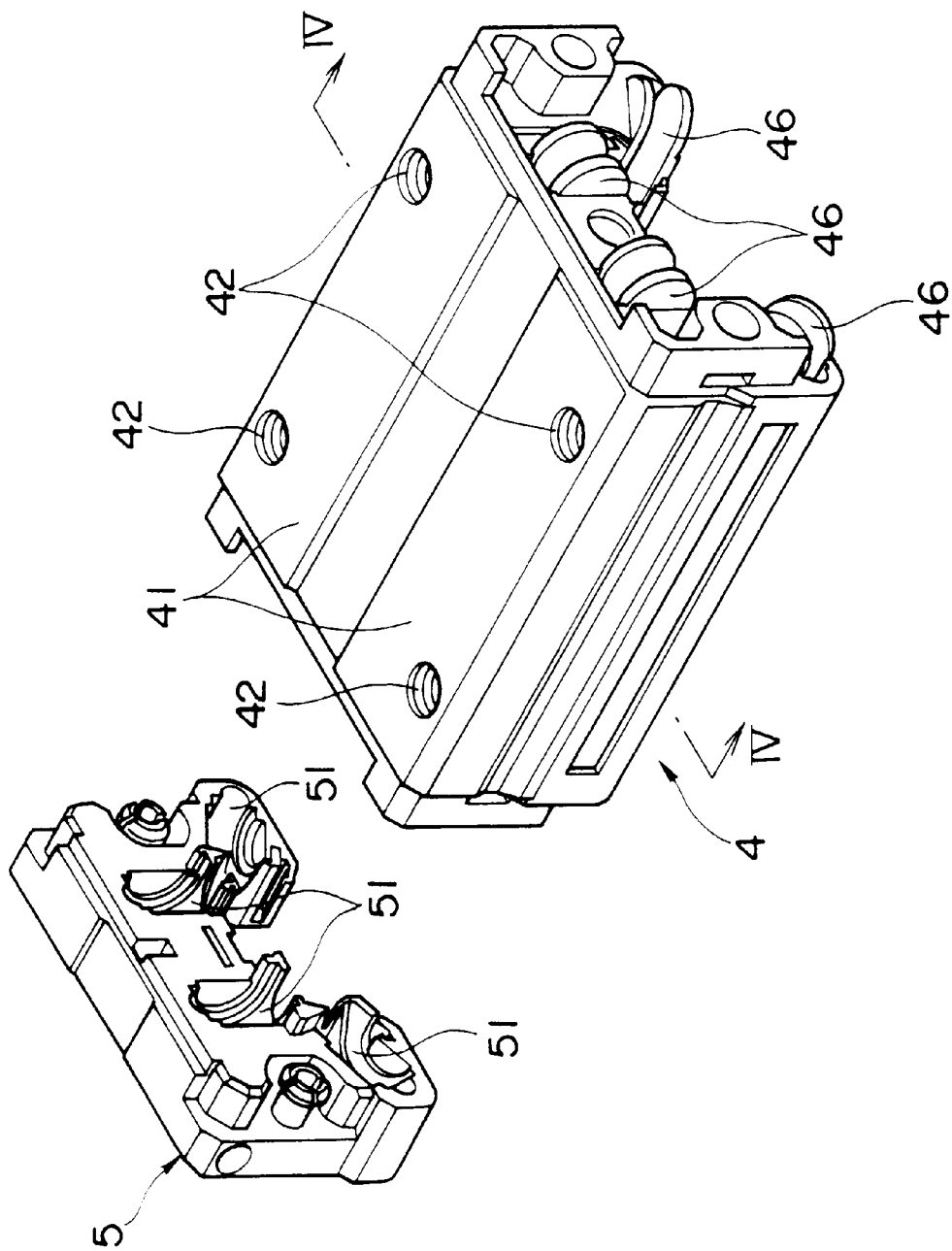
FIG. 3 is an exploded perspective view of a slider in accordance with the embodiment.
Figure 4:
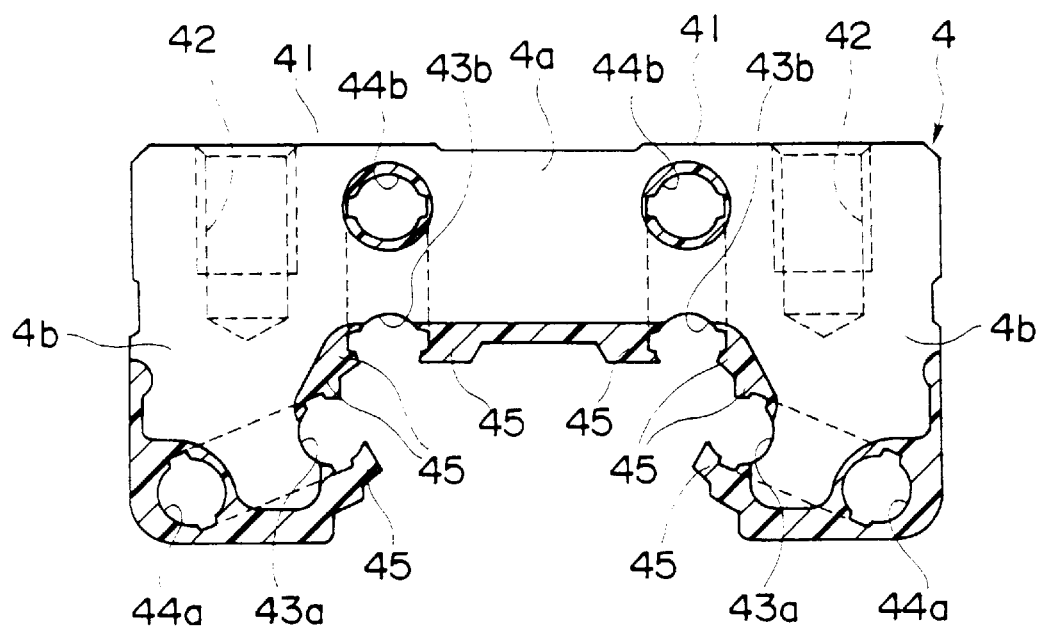
FIG. 4 is a sectional view taken along a line IV—IV of FIG. 3.

As illustrated in FIG. 3 and FIG. 4, the moving block 4 is provided with a horizontal portion 4a where the attaching face 41 is formed and a pair of skirt portions 4b hanging down from the horizontal portion 4a and the section thereof is formed in substantially a saddle form and four tracks of load rolling faces 43a and 43b are formed on the lower face of the horizontal portion 4a and on the inner faces of the respective skirt portions 4b opposingly to the ball rolling faces 11a and 11b of the track rail 1. Also, ball return holes 44a and 44b respectively corresponding to the load rolling faces 43a and 43b are formed at the horizontal portion 4a and the skirt portions 4b and the respective load rolling faces 43a and 43b and the corresponding ball return holes 44a and 44b are connected by direction change paths 51 of the balls 3 formed in the end caps 5 thereby forming the infinite circulation paths of the balls.

Thereby, when the balls 3 which have been under load between the rolling faces 11a and 11b of the track rail 1 and the load rolling faces 43a and 43b of the moving block 4, finish running on the load rolling faces 43a and 43b with the movement of slider 2, they are relieved from the load and enter the direction change paths 51 of one of the end caps 5, and run under no load in the ball return holes 44a and 44b of the moving block 4 toward a direction reverse to the running direction at the load rolling faces 43a and 43b. Further, the balls 3 which have finished running in the ball return holes 44a and 44b, enter again between the track rail 1 and the moving block 4 via the direction change paths 51 of the other one of the end caps 5 and run on the load rolling faces 43a and 43b under load.

Further, ball retaining portions 45 are formed on the both sides of the respective load rolling faces 43a and 43b as if covering the load rolling faces 43a and 43b thereby preventing the balls 3 which are disposed on the load rolling faces 43a and 43b from rolling down from the slider 2 when the slider 2 is removed from the track rail 1.

Further, according to the embodiment, in view of avoiding contact among balls in the infinite circulation paths and preventing as less as possible the wear of the balls 3, ball chains are constituted by rotatably fitting the balls 3 in belt-like cages 7 made of a synthetic resin and the ball chains are integrated to the infinite circulation paths. Therefore, recessed grooves for supporting the both edge portions of the belt-like cages 7 circulating in the infinite circulation paths along with the balls 3, are formed in the hall return holes 44a and 44b and the ball retaining portions 45.

Furthermore, as illustrated in FIG. 3, ball guide portions 46 in a semicircular shape are projected at the foreword and rearward end faces of the moving block 4 for guiding the balls 3 entering and leaving the ball return holes 44a and 44b in cooperation with the direction change paths 51 of the end caps 5.

Figure 5:
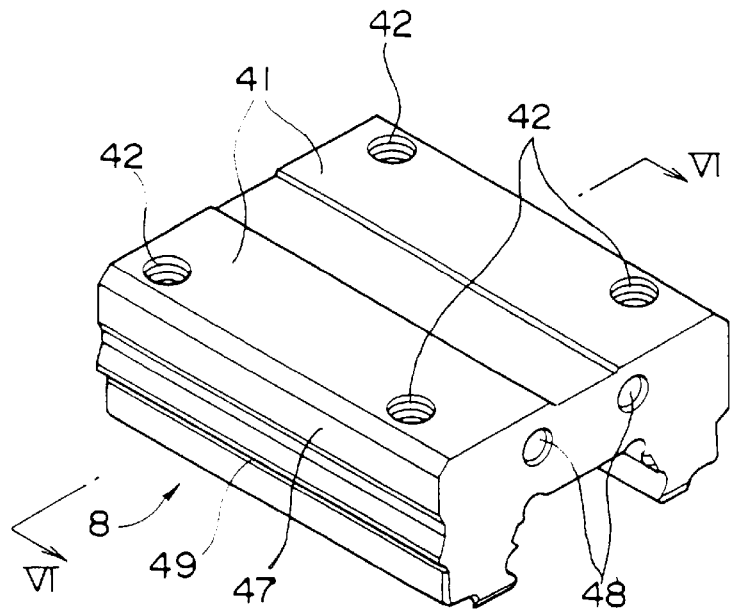
FIG. 5 is a perspective view showing a block main body constituting a core part of a moving block according to the embodiment.
Figure 6:
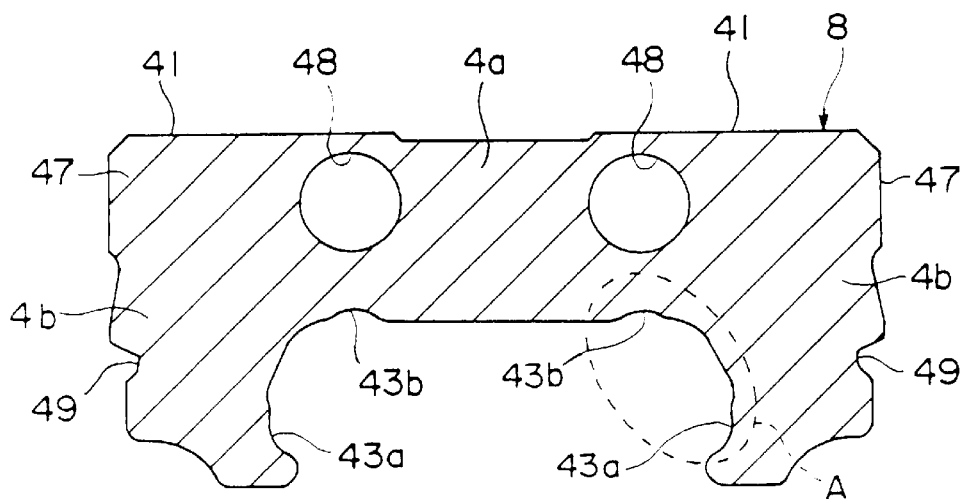
FIG. 6 is a sectional view taken along a line VI—VI of FIG. 5.

The moving block 4 is formed by building by injection molding a synthetic resin onto the block main body 8 made of a metal which is formed by mechanical working. Portions requiring mechanical strength such as the movable body attaching face 41, the load rolling faces 43a and 43b of the balls 3 and the like, are formed in the block main body 8, whereas portions with no significance in mechanical strength such as the ball return holes 44a and 44b, the ball retaining portions 45 and the hall guide portions 46 and the like, are formed by a synthetic resin whereby light weight formation of the moving block 4 is achieved as light as possible. FIG. 5 and FIG. 6 show the block main body 8 before building a synthetic resin thereon. According to the block main body 8, after the outline shape of the horizontal portion 4a and the skirt portions 4b has been formed by drawing, the movable body attaching face 41 and reference side faces 47 are formed with a predetermined accuracy by polishing and through holes 48 which become base holes for the ball return holes 44b, are formed by boring. Further, in the drawing process, recessed portions 49 which become resin storages are formed on the outer side of the skirt portions 4b with a purpose of promoting adherence of a synthetic resin which is to be built in later steps with respect to the block main body 8.

Figure 7:
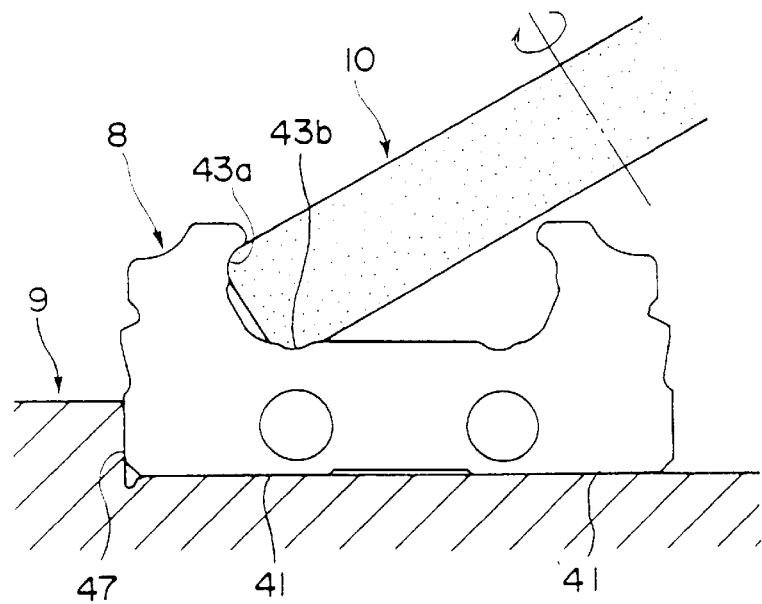
FIG. 7 is a front view showing a behavior of grinding operation on load rolling faces and smooth faces with respect to the block main body.

The load rolling faces 43a and 43b are needed to form on the block main body 8 and the load rolling faces 43a and 43b are formed as illustrated in FIG. 7 after forming the movable body attaching face 41 and the reference side faces 47. That is, the movable body attaching face 41 and the reference side faces 47 which have already been formed, are brought into contact with attaching reference faces of a polishing stage 9 thereby fixing the block main body 8, under which the grindstone 10 is brought into contact with the block main body 8 whereby the load rolling faces 43a and 43b are polished. At this occasion the load rolling faces 43a and 43b are polished in one machining operation by using the same grindstone 10 in order to render accurate the positional relationship among the load rolling faces 43a formed at the skirt portions and the load rolling faces 43b formed at the horizontal portion.

Figure 8:
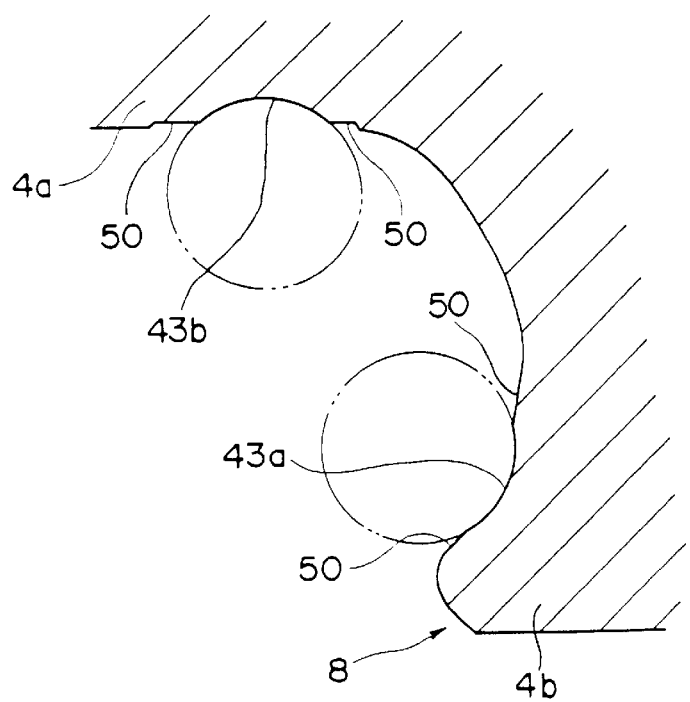
FIG. 8 is an enlarged view showing details of a region encircled by a circle A described by a broken line in FIG. 6.

FIG. 8 is an enlarged view showing the surroundings of the load rolling faces 43a and 43b which have been polished. According to the polishing operation using the grindstone 10 not only the load rolling faces 43a and 43b are formed but pairs of smooth faces 50 are formed along both edges in the longitudinal direction of the respective load rolling faces.

That is, the grindstone 10 is a formed polishing grindstone having a shape reverse to the shape of the load rolling faces 43a and 43b and the smooth faces 50 and the smooth faces 50 are formed with a constant positional accuracy in respect of the load rolling faces 43a and 43b which are disposed contiguously to the smooth faces 50.

In steps of injection molding of a synthetic resin, mentioned later, the smooth faces 50 function as positioning reference faces of the block main body 8 in the mold and are used as measuring reference faces in measuring whether the load rolling face 43a and 43b are formed with a predetermined dimensional accuracy.

Next, an explanation will be given of a step of building a synthetic resin by injection molding onto the block main body 8 which has been finished in a predetermined shape in this way.

The injection molding is executed by a process in which the block main body 8 all the machining of which has been finished, is arranged in a mold as a core, which is referred to as insert molding, whereby a synthetic resin is built only at predetermined positions of the block main body 8 by which the ball return holes 44a and 44b, the ball retaining portions 45 and the like, are formed.

Figure 9:
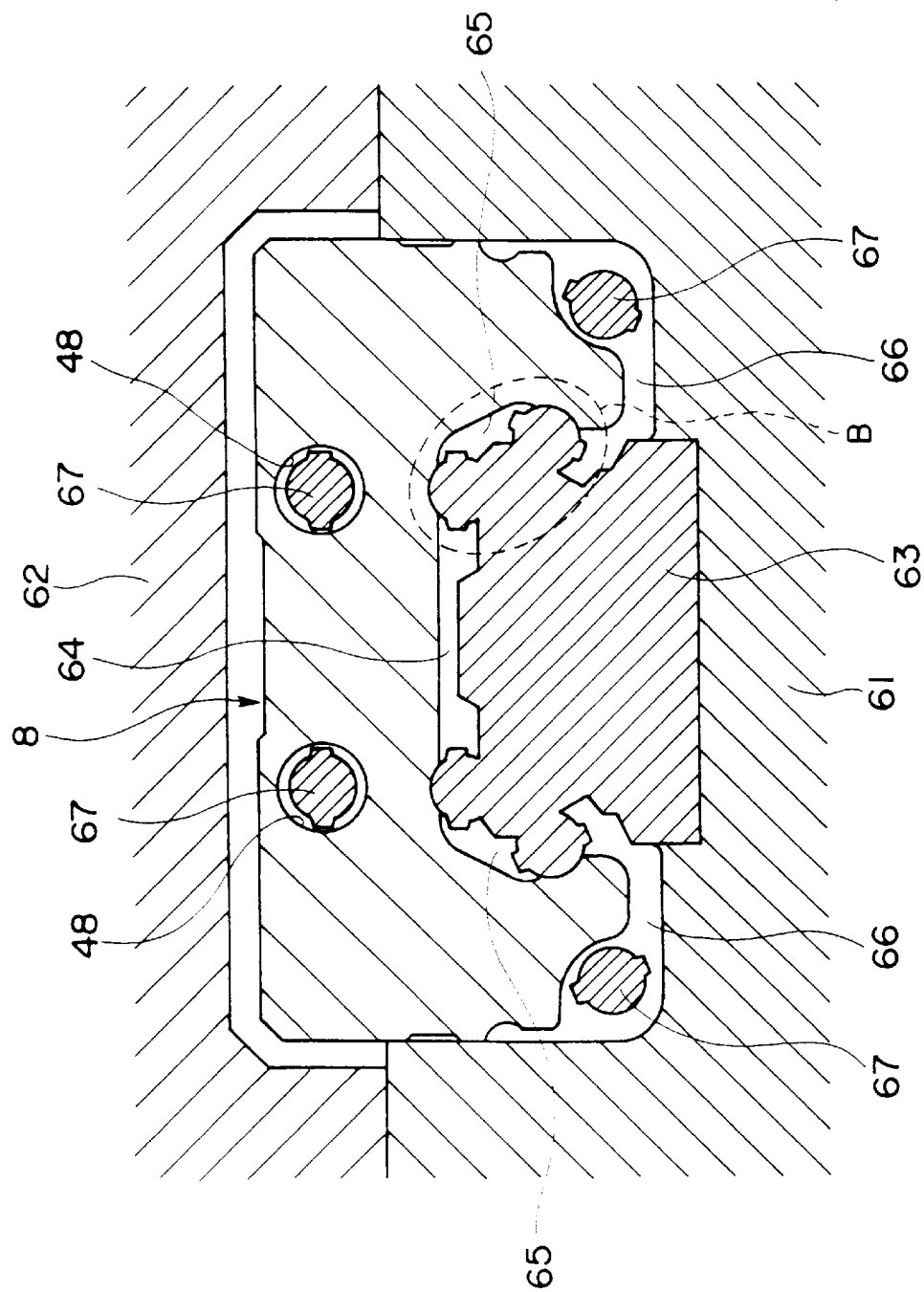
FIG. 9 is a sectional view showing the block main body inserted into a mold.

FIG. 9 is a sectional view showing the block main body 8 which is inserted into molds 61 and 62. A projected support portion 63 for fixing the block main body 8 is erected on the mold 61 and positioning of the block main body 8 in the molds 61 and 62 is carried out by fitting the block main body 8 in respect of the projected support portion 63 from the axial direction (orthogonal to paper face) and cavities 64 and 65 corresponding to the ball retaining portion 45 of the moving block 4 are formed between the block main body 8 and the projected support portion 63 whereas cavities 66 for forming the ball return holes 44a are formed between the skirt portions 4b of the block main body 8 and the mold 61. Further, rod-like mold bodies 67 having a sectional shape in agreement with the shape of the ball return holes 44a and 44b, are inserted into the through holes 48 of the block main body 8 and the cavities 66 by which the ball return holes 44a and 44b are formed when the molten synthetic resin is filled in the through holes 48 and the cavities 66.

Also, the mold 61 is brought into contact with the lower end edges of the reference side faces 47 of the block main body 8 by which the shielding of the molten synthetic resin filled in the cavities 66 is carried out and the synthetic resin is prevented from covering the reference side faces 47.

Figure 10:
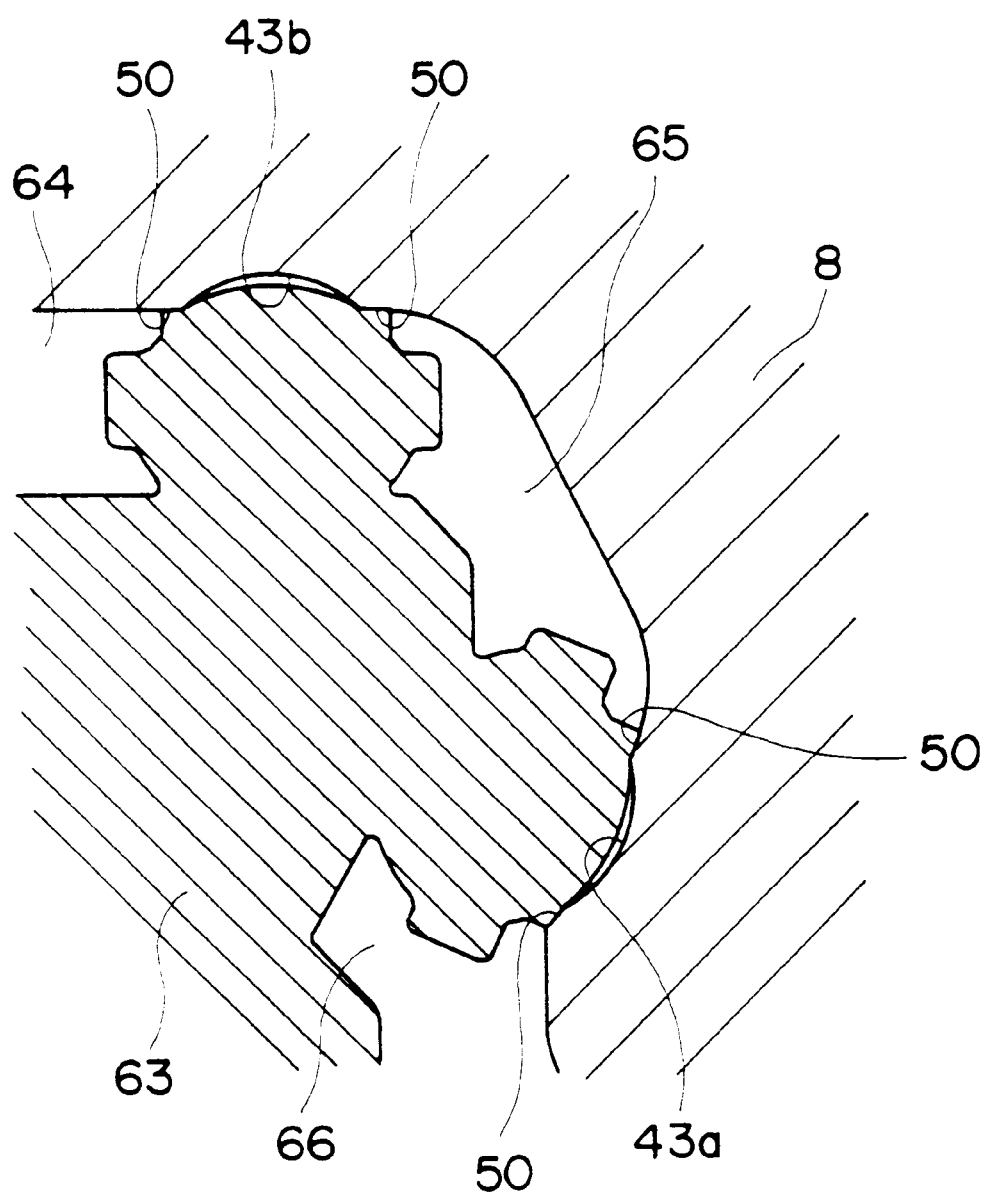
FIG. 10 is an enlarged view showing details of a region encircled by a circle B drawn by a broken line in FIG. 9.

Meanwhile, FIG. 10 is an enlarged view showing details of a state of contact between the projected support portion 63 and block main body 8. When the synthetic resin is put on the load rolling faces 43a and 43b formed on the block main body 8, it becomes a hazard against the running of the balls 3 and therefore, it is required in such an insert molding that shielding of the molten synthetic resin is firmly carried out between the load rolling faces 43a and 43b and the contiguous cavities 64, 65 and 66. Accordingly, in fitting the block main body 8 to the projected support portion 63, the projected support portion 63 is brought into contact with the smooth faces 50 which are formed on the both edges of the load rolling faces 43a and 43b whereby the shielding the molten synthetic resin filled in the cavities 64, 65 and 66 is carried out. Further, the projected support portion 63 is brought into contact with the smooth faces 50 to span across the load rolling faces 43a and 43b to prevent the load rolling faces 43a and 43b which have been finished in a predetermined accuracy from damaging by the contact with the projected support portion 63.

Further, after inserting the block main body 8 into the molds 61 and 62, the molten synthetic resin is filled in the cavities 64, 65 and 66 formed by the block main body 8 and the mold 61 and the synthetic resin is built on the main body 8 whereby the moving block as illustrated by FIG. 3 and FIG. 4 is completed.

According to the step of the insert molding which is carried out as has been described above, in positioning the block main body 8 in the mold 61 in this embodiment, the projected support portion 63 erected on the mold 61 for fitting to the block main body 8, is brought into contact with the pairs of smooth faces 50 which are formed along the both edges of the load rolling faces. Therefore, the following advantages is achieved in comparison with the conventional manufacturing method in which the positioning of the block main body is carried out by bringing the projected support portion in direct contact with the load rolling faces.

That is, the smooth faces 50 are formed by polishing them simultaneously with the load rolling faces 43a and 43b and therefore, the accuracy of the formed positions and the smoothness are significantly excellent and by bringing the projected support portion 63 into contact with the smooth faces 50 which have been formed with such a high accuracy, the projected support portion 63 and the smooth faces 50 are brought into close contact with each other whereby the molten synthetic resin can be shielded with certainty by the smooth faces 50. Therefore, according to the moving block 4 manufactured by the method of this embodiment, no burr of synthetic resin is caused on the load rolling faces 43a and 43b whereby smooth running of hall can be guaranteed.

Also, it is possible to promote the positioning accuracy of the block main body 8 inserted into the molds 61 and 62 by bringing the projected support portion 63 into contact with the smooth faces 50 which have been formed with high accuracy, whereby the locations of forming the ball retaining portions 45 in respect of the load rolling faces 43a and 43b of the block main body 8 are made accurate. Therefore, the balls 3 running on the load rolling faces 43a and 43b can be prevented from being brought into contact with the ball retaining portions 45 and generation of noise can be avoided as less as possible in circulating the balls 3.

Incidentally, according to the embodiment, when the block main body 8 is inserted into the molds 61 and 62, the load rolling faces 43a and 43b with a predetermined accuracy prior to the insert molding, are not damaged by the step of the insert molding since spaces are formed between the load rolling faces 43a and 43b and the projected support portion 63 whereby the smooth running of the balls 3 can be guaranteed.

What is claimed is:

1. A method of making a slider of a linear guide device comprising:

a first step of forming a block main body made of a metal which becomes a core part of the slider in a predetermined shape by machining and forming load rolling faces of balls on the block main body;

a second step of inserting the block main body formed by the first step into a mold and executing an injection molding of a synthetic resin by which ball retaining portions are built up on both sides of the load rolling faces of the block main body;

wherein pairs of smooth faces for shielding the molten synthetic resin are formed along both edges in a longitudinal direction of the load rolling faces formed in the block main body in the first step; and wherein the block main body is fixed at a predetermined position in the mold by bringing a projected support portion erected on the mold into contact with the smooth faces for shielding the molten synthetic resin in the second step.

2. The method of making a slider of a linear guide device according to claim 1, wherein spaces are formed between the load rolling faces of the block main body and the projected support portion of the mold when the block main body is fixed into the mold in the second step.

* * * * *